US008612320B2

(12) United States Patent
Walker et al.

(10) Patent No.: US 8,612,320 B2
(45) Date of Patent: Dec. 17, 2013

(54) METHOD AND APPARATUS FOR DETECTING FRAUDULENT LOANS

(75) Inventors: Robert L. Walker, Tustin, CA (US); Benjamin C. Graboske, Santa Ana, CA (US); George S. Livermore, Santa Ana, CA (US)

(73) Assignee: Corelogic Solutions, LLC, Santa Ana, CA (US)

( * ) Notice: Subject to any disclaimer, the term of this patent is extended or adjusted under 35 U.S.C. 154(b) by 744 days.

(21) Appl. No.: 11/623,020

(22) Filed: Jan. 12, 2007

(65) Prior Publication Data

US 2008/0147454 A1 Jun. 19, 2008

Related U.S. Application Data

(60) Provisional application No. 60/870,042, filed on Dec. 14, 2006.

(51) Int. Cl.
*G06Q 40/00* (2012.01)
(52) U.S. Cl.
USPC ............................................. 705/35; 705/38
(58) Field of Classification Search
None
See application file for complete search history.

(56) References Cited

U.S. PATENT DOCUMENTS

| 5,797,133 | A * | 8/1998 | Jones et al. ...................... 705/38 |
| 6,324,524 | B1 * | 11/2001 | Lent et al. ......................... 705/38 |
| 2002/0133371 | A1 * | 9/2002 | Cole ................................. 705/1 |
| 2002/0156787 | A1 | 10/2002 | Jameson et al. |
| 2005/0203834 | A1 * | 9/2005 | Prieston ........................... 705/38 |
| 2006/0224480 | A1 * | 10/2006 | Bent et al. ........................ 705/35 |
| 2007/0226129 | A1 * | 9/2007 | Liao et al. ....................... 705/38 |
| 2009/0006185 | A1 | 1/2009 | Stinson |
| 2011/0258127 | A1 | 10/2011 | Graboske et al. |

OTHER PUBLICATIONS

Sichelman, Lew, Mortgage fraud widens, Jul. 21, 1997, National Mortgage News, vol. 21, iss. 42., p. 1,2.*
Sichelman, Lew, Mortgage fraud widens, Jul. 21, 1997, National Mortgage News, vol. 21, iss. 42, pp. 1,2.*

* cited by examiner

*Primary Examiner* — Rajesh Khattar
*Assistant Examiner* — Carol See
(74) *Attorney, Agent, or Firm* — Oblon, Spivak, McClelland, Maier & Neustadt, L.L.P.

(57) ABSTRACT

The present invention relates to a method and apparatus for detecting fraudulent activity by preventing the rapid funding of multiple loans on the same property, by providing a collective database where real estate property information is examined and the apparatus detects whether at least two mortgage applications are the same property as collateral.

11 Claims, 6 Drawing Sheets

| MULTIPLE APPLICATIONS PENDING | | | | | | | |
|---|---|---|---|---|---|---|---|
| | LOAN NUMBER | SUBMISSION DATE | LAST STATUS UPDATE | PROPERTY ADDRESS | BORROWER NAME | CURRENT LOAN STATUS | ACTION REQUIRED |
| USER DATA | 05-7615 | 08-15-2006 | 08-28-2006 | 39 GREYLOCK RIDGE, 14534 | JOHN WALKER | APPROVED | NONE |
| MATCHED DATA (LENDER CODE 7) | 11-8119 | 08-20-2006 | 08-28-2006 | 39 GREYLOCK RIDGE, 14534 | JOHN WALKER | APPROVED | WATCH |
| POSSIBLE FRAUD SCENARIO 1 | | | | | | | |
| USER DATA | 05-9111 | 08-01-2006 | 08-28-2006 | 3901 MINEOLA WAY, 33579 | JAMES SMITH | APPROVED | CHECK STATUS WITH LENDER NUMBER 15 |
| MATCHED DATA (LENDER CODE 15) | 15-7115 | 07-25-2006 | 08-28-2006 | 3901 MINEOLA WAY, 33579 | JAMES SMITH | AWAITING DOCS | |
| POSSIBLE FRAUD SCENARIO 2 | | | | | | | |
| USER DATA | 05-6515 | 07-11-2006 | 08-28-2006 | 15 ORION, 92506 | JIM BEAN | DOCS RECEIVED | DO NOT FUND POSSIBLE FRAUD. CONTACT LENDER 9 |
| MATCHED DATA (LENDER CODE 9) | 09-3517 | 08-02-2006 | 08-28-2006 | 15 ORION, 92506 | JIM BEAN | FUNDED | |

FIG. 1

| | YOUR VALUE (ELAPSED DAYS) | BENCHMARK VALUE | DIFFERENCE |
|---|---|---|---|
| PENDING - OUT-FOR-DOC-SIGNATURE | 10 DAYS | 12 DAYS | -2 DAYS |
| PENDING - DOCS RECEIVED | 12 DAYS | 15 DAYS | -3 DAYS |
| PENDING - FUNDED | 14 DAYS | 17 DAYS | -3 DAYS |

FIG. 5

METHOD AND APPARATUS FOR DETECTING FRAUDULENT LOANS

CLAIM OF PRIORITY UNDER 35 U.S.C. §119

The present Application for Patent claims priority to Provisional Application No. 60/870,042, filed on Dec. 14, 2006, and hereby expressly incorporated by reference herein.

FIELD OF THE INVENTION

The present invention generally relates to a method and system for detecting fraud. More specifically, the present invention relates to a method and apparatus for detecting fraudulent activity by preventing the rapid funding of multiple loans on the same property.

BACKGROUND OF THE INVENTION

FBI statistics indicate that mortgage fraud is on the rise. In some cases, consumers seek to defraud mortgage lenders for personal profit. To this end, borrowers seeking to defraud lenders have become increasingly sophisticated. A large national bank reported millions of dollars in losses when consumers apply for multiple loans with multiple lenders, on the same property. For example, suppose an individual applies for and is approved for an equity loan at 123 Jones Street in Fresno, Calif. Not only has the borrower been approved by lender A, but he was also approved by lender B, lender C, and lender D for an equity loan on the same property. Thus far, there is no problem. Consumers have a freedom of choice to apply for a loan wherever they desire. The problem comes when the approved loan is not in a second lien position as stated as a condition for approval in the application. Having secured and funded an equity loan with lender A, fraud occurs when the borrower also secures incremental loans with lenders B, C, and/or D. Equity loans typically involve minimum advances (you take cash from the signing table) and immediate access to cash via checking accounts or debit cards. The unscrupulous borrower can take the funds and run from lenders A, B, C, and/or D. The losses at lender A may be covered by the equity in the home, however, the losses at lenders B, C, and/or D are complete and non-recoverable since the property has been stripped of any owners' equity.

SUMMARY OF THE INVENTION

The present invention attempts to remedy the problems discussed above, amongst others, related to fraudulent activities which occur during mortgage transactions between consumers and various lenders.

The present invention provides a novel system and method which is able to detect and prevent fraudulent activity by consumers attempting to obtain two or more fraudulent loans on the same property.

The present invention further provides a novel system and method wherein lenders are able to identify areas of strengths and areas of weaknesses with respect to mortgage application completion time.

The present invention further provides a novel system and method wherein a third party can proactively monitor deals that hit various alert stages and can directly call lenders to suggest further investigation and/or alert them of any suspicious activity.

BRIEF DESCRIPTION OF THE DRAWINGS

The above, as well as other advantages of the present invention, will become readily apparent to those skilled in the art from the following detailed description of the preferred embodiments when considered in the light of the accompanying drawing in which:

FIG. 1 is a printout of an exemplary report of the present invention.

FIG. 5 is another exemplary report produced by the Prism Database system diagramming various actions taken by the company and industry in the application process.

DETAILED DESCRIPTION OF THE PREFERRED EMBODIMENTS

Figure 2:
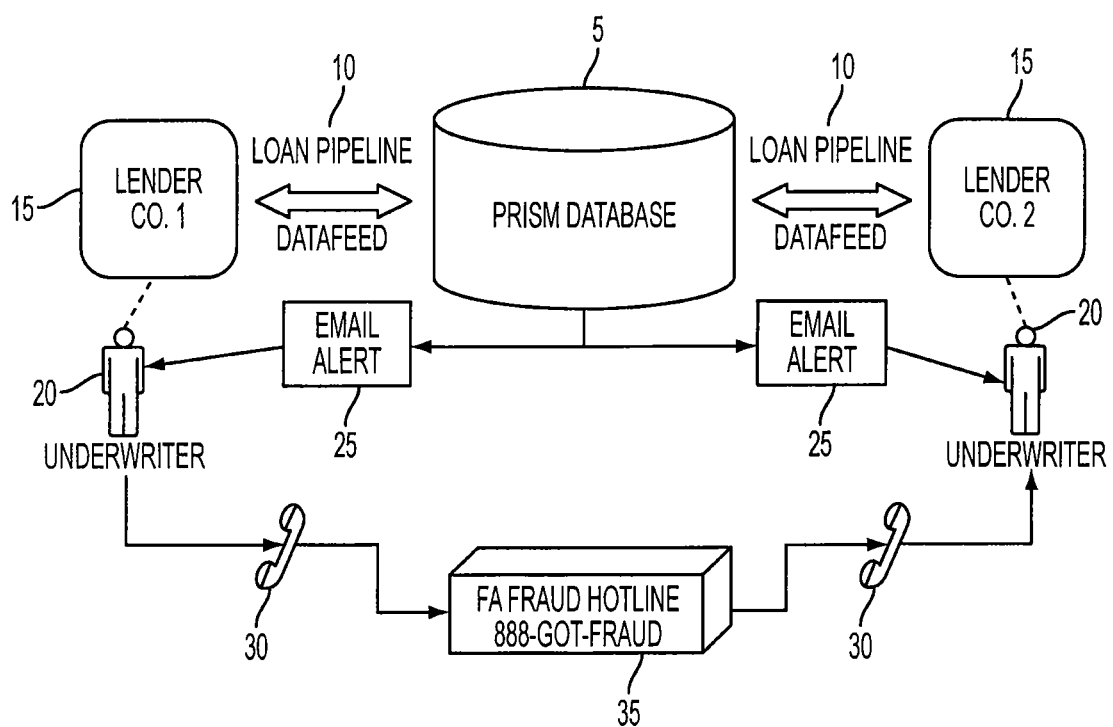
FIG. 2 is diagram of an exemplary embodiment of the Prism Database system.

The present invention provides a method and system for detecting and preventing fraudulent activity by preventing the finding of multiple loans on the same property/same address.

The present invention generally relates to a method and apparatus for collecting information from mortgage applications to determine whether there has been more then one application submitted for the same property to obtain a loan or collateral on that property. However, the preferred embodiments of the present invention may include a method and system for collecting information from approved mortgage applications to determine whether there has been more than one application submitted for loan or collateral to a lender. It should be appreciated that even though the term "approved application" is a commonly used term in the industry which describe an application where the lender has agreed to fund the applicant with no conditions, that there are similar uses for these terms. For example, there are many instances where lenders still use this term when there are certain conditions, e.g., pending a search to determine whether there are any liens on the property. The present invention can be used to describe various types of loan applications, even though in the preferred embodiment "approved" applications are being used.

The application also uses the term property to describe a piece of land and/or building (e.g., house) located on that land. It should be appreciated that this property may be identified by numerous ways including, but not limited to, property address, parcel number, map coordinates, lot numbers or other similar identifiers as known to one skilled in the art.

The present invention collects on a cooperative basis desired mortgage application data from one or more lenders about each of their potential borrowers. In one exemplary embodiment, the only loans submitted to the main database, a.k.a. PRISM database, are those loans that have received preliminary credit approval from the lender. For example, the type of application data that can be collected may include, but is not limited to: (1) Loan Number; (2) Loan Status (Doc. Prep., Closed, Funded, etc.); (3) Loan Status Date; (4) Subject Property Address; (5) Subject Property State; (6) Subject Property Zip; (7) Borrower First Name; (8) Borrower Last Name; (9) Loan Amount; (10) Sale Amount; (11) Appraised Amount; (12) Channel; (13) Loan Purpose (Purchase, Cash Out Refi., Rate/Term Refi., HELOC); and/or (14) Loan Product.

The present invention is a fraud detection system comprising a module including a main database, e.g., a server, which may internally include a software program which is able to extract various data from the application submitted by the various lenders, and furthermore, the module is able to compare the data and provide the desired information for each lender. As previously discussed, the general information provided by the module includes alerting the lenders whether an applicant has more than one application on the same property which has been approved by two or more lenders. Moreover, other information can be obtained as discussed below with reference to FIGS. 4 and 5. It should be appreciated that the software program may be placed on another server/database in an alternative embodiment.

FIG. 1 illustrates a sample Prism Match Report which is a report generated by the present invention. The section entitled "Multiple Application Pending" shows a situation where there are two mortgage loan applications pending, loan application #05-7615 and loan application #11-8119. The first two digits of the loan number can, for example, indicate the lender number. Therefore, loan application #05-7615 originated from lender #05 and loan application #11-8119 originated from lender #11. Loan application #05-7615 was submitted on Aug. 15, 2006 and loan application #11-8119 was submitted on Aug. 20, 2006. Both loans had their status updated on Aug. 28, 2006. The reason these two mortgage loan applications were flagged was because there were some matches in the loan application profiles. For example, both loan applications target the same property address 39 Greylock Ridge, 14534, and both have the same borrower name. However, the "Action Required" field indicates that there is no immediate action required. The present invention, however still considers this a "watch" situation for both lenders since this is a "potential" fraud situation in the making. Accordingly, the system reports that loan number 11-8119 should be put on "watch" status as indicated in the report in FIG. 1. Furthermore, it should be appreciated that the report could be configured to indicate a "watch" status for both the lenders, depending on the desires of the users, e.g., lenders.

In the second section entitled Possible Fraud Scenario 1, loan application #05-9111 and loan application #15-7115 could possibly have some problems. For example, both loan applications target the same property address 3901 Mineola Way, 33579, and both have the same borrower name. Unlike the previous situation, there could be some problems in this situation because while loan application #05-9111 was approved, loan application #15-7115 is already waiting for loan documents that were sent out, to come back signed. Thus, loan application #15-7115 is much further in the process than loan application #05-9111. Therefore, the action required field indicates that lender #05, the originator of loan application #05-9111, should check with lender #15, the originator of loan application #15-7115, on the status of loan application #15-7115, before lender #05 sends out any loan documents for signature for loan application #05-9111.

In the third section entitled Possible Fraud Scenario 2, loan application #05-6515 and loan application #09-3517 have some severe problems. For example, both mortgage loan applications target the same property address 15 Orion, 92506 and both have the same borrower name. Here, there is a strong possibility that fraud is being committed because while loan application #05-6515 has received signed documents, loan application #09-3517 is already being funded. Thus, the action required field indicates that lender #05 should stop loan application #05-6515 and contact lender #09 to notify lender #09 that the borrower is attempting to secure two loans on the same property.

FIG. 2 shows a block diagram of the main database system 5. A main database 5, a.k.a. PRISM database, contains information collected from participating mortgage lenders about every loan applicant for each participating mortgage lender. The main database 5 can be accessed by an underwriter 20 from a lender 15 via a loan pipeline 110. The main database 5 can also generate an e-mail alert 25 that is sent to the underwriter 20 in situations where there is important information about a mortgage loan application such as the creation of another mortgage loan application through another lender which is secured on the same property. In the exemplary embodiment shown in FIG. 2, the underwriter 20 can have access to a fraud hotline 35 via a communication device, e.g. phone 30, computer, etc., in case the underwriter 20 has questions regarding how to work with other lenders to stop fraud.

In one exemplary embodiment, a third party (e.g., offshore telephonic clearing house) may search the main database 5 for potential fraud without disclosure to the originators. The third party can proactively monitor deals that hit alert stages and can directly call lenders to suggest further investigation and/or alert them of any suspicious activity.

Figure 3:
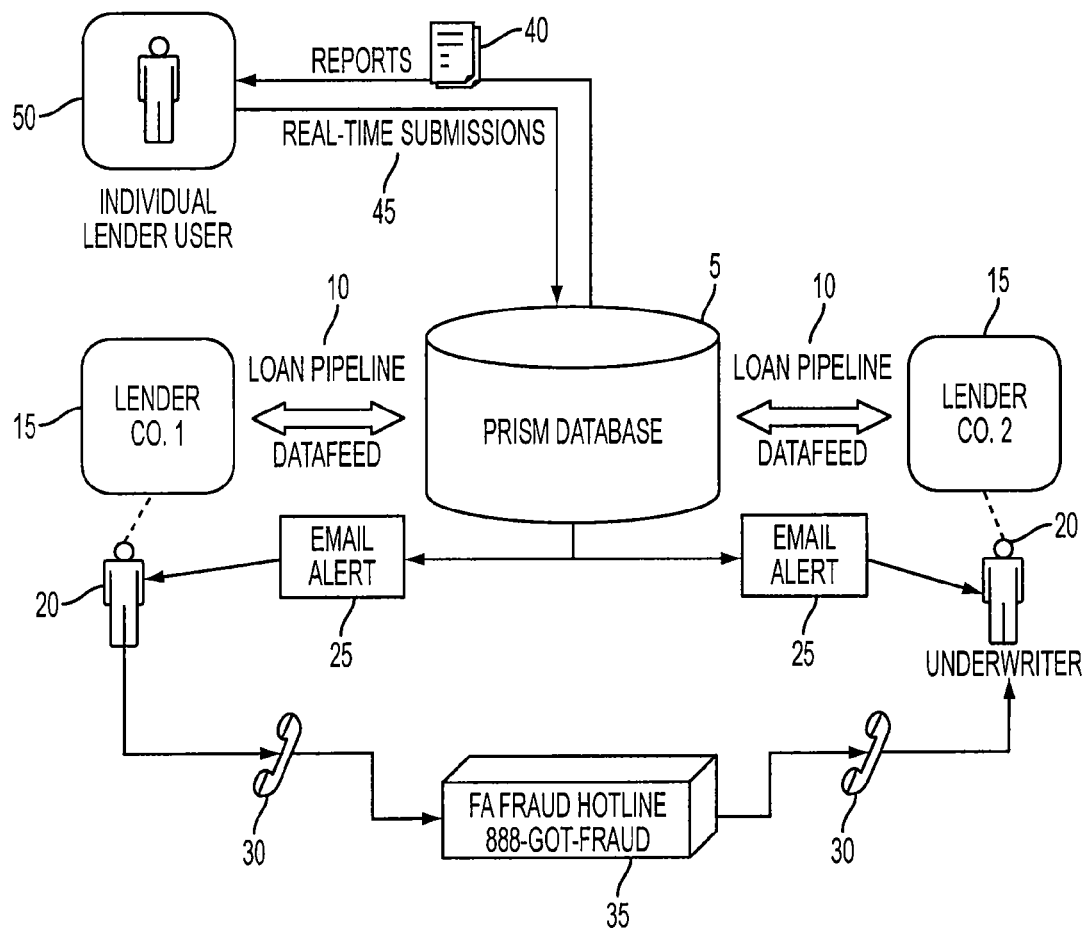
FIG. 3 is another diagram of an exemplary embodiment of the Prism Database system.

As shown in FIG. 3, the reports can also be generated and/or accessed in real time. In that situation, an individual lender user 50 can send real-time submissions 45 to the main database 5 which contains information collected from loan applications. This information is then available to other underwriters 20 and lenders 15. In addition, the individual lender user 50 can receive reports 40 from the main database 5 in real time. These reports can include, for example, an analysis of a mortgage loan application that the individual lender user 50 has submitted to the main database 5. These reports can also include, for example, other mortgage loan applications, which the individual lender user 50 wishes to review. Reports can also be generated on the overall status or status of certain operations of lending institutions. These reports can then, for example, be analyzed on their own, or in context with other reports from the same lending institution or other lending institutions.

Figure 4:
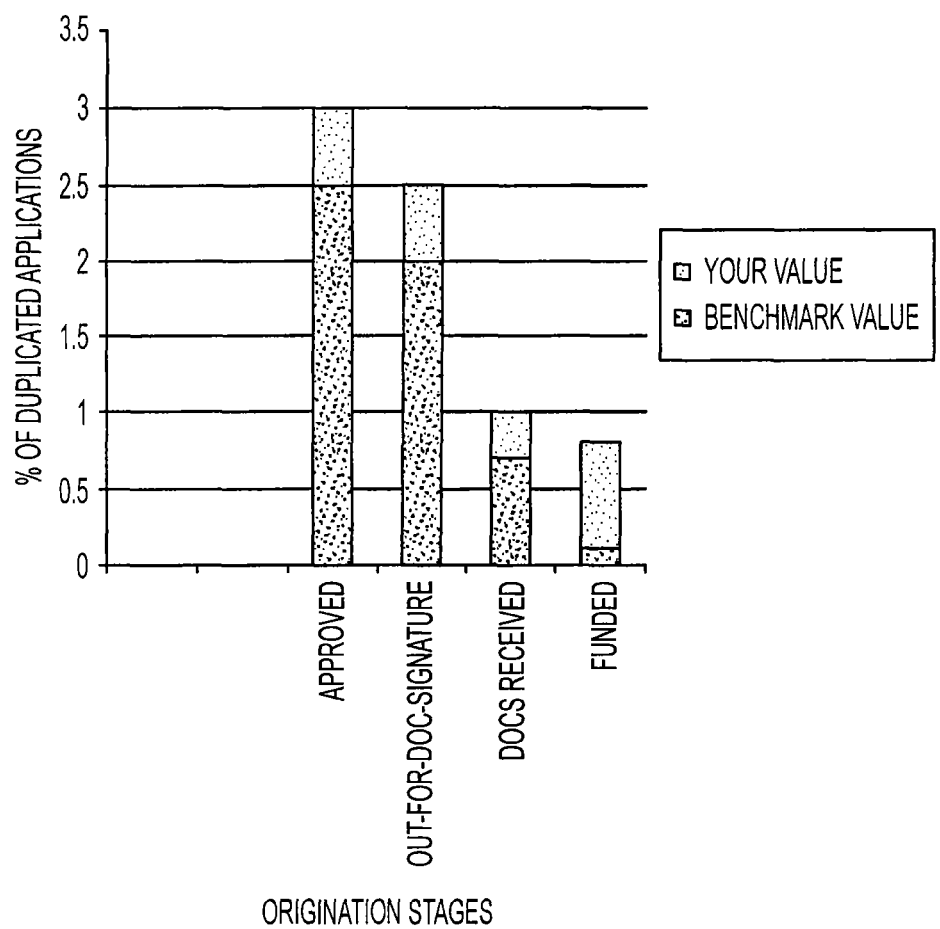
FIG. 4 is an exemplary report produced by the Prism Database system diagramming various actions taken by the company and industry in the application process.

For example, in FIG. 4, the present invention can compile a chart based on mortgage application data collected. This can be useful, for example, to disclose the percentage of applications that are duplicates or in other words have applications which are filed with other lending institutions that target the same property for collateralization. In the report, for example, there can be a benchmark value disclosing the average value of the industry for comparison. This is indicated as "benchmark value" on the chart in FIG. 4. There can also be a value disclosing the user's value. This is indicated as "your value" on the chart in FIG. 4. Thus, a report, for example, on the percent of duplicated applications for each step of the application process can be shown. For example, the benchmark has 2.5% of their approved applications as duplicates whereas, the particular lender has a 3% duplicate application rate. This means that the subject lender may have inefficiencies since they are the "beneficiary" of more duplicate applications than would be expected based upon industry norms. Funding loans on the same property is a much more onerous problem. In this example, it should be noted that the lender in the example funds about 0.8% of their loans on the same property as other lenders. The industry norm is about 0.2%. This is a huge and financially damaging problem that the lender must fix and this report shows that our lender is being adversely selected by some force in the market. This report will alert management of each lending institution to the problem.

Furthermore, the data can be used to analyze the lending institution's own efficiency as compared with an industry benchmark. As can be seen in FIG. 5, the time required for applications in lending institution to complete each phase is listed in the column entitled "Your Value (elapsed days)"

while the time required for applications in the industry to complete each phase is listed in the column entitled "Benchmark Value." The difference between the two times is listed in the column entitled "Difference." Thus, for the lending institution, the "Pending—Out-for-document signature applications took 10 days to be completed while the industry took 12-days. Thus, the lending institution was actually faster by 2 days. However, for "Pending—Docs received" applications, the lending institution took 12-days to complete while the industry took 15-days. Thus, the lending institution was actually faster by 3 days. Therefore, this can be an area to target for policies and procedures to speed up the application completion time. Thus, the lending institution can now identify which areas are its strengths and which areas are its weaknesses with respect to application completion time.

Figure 6:
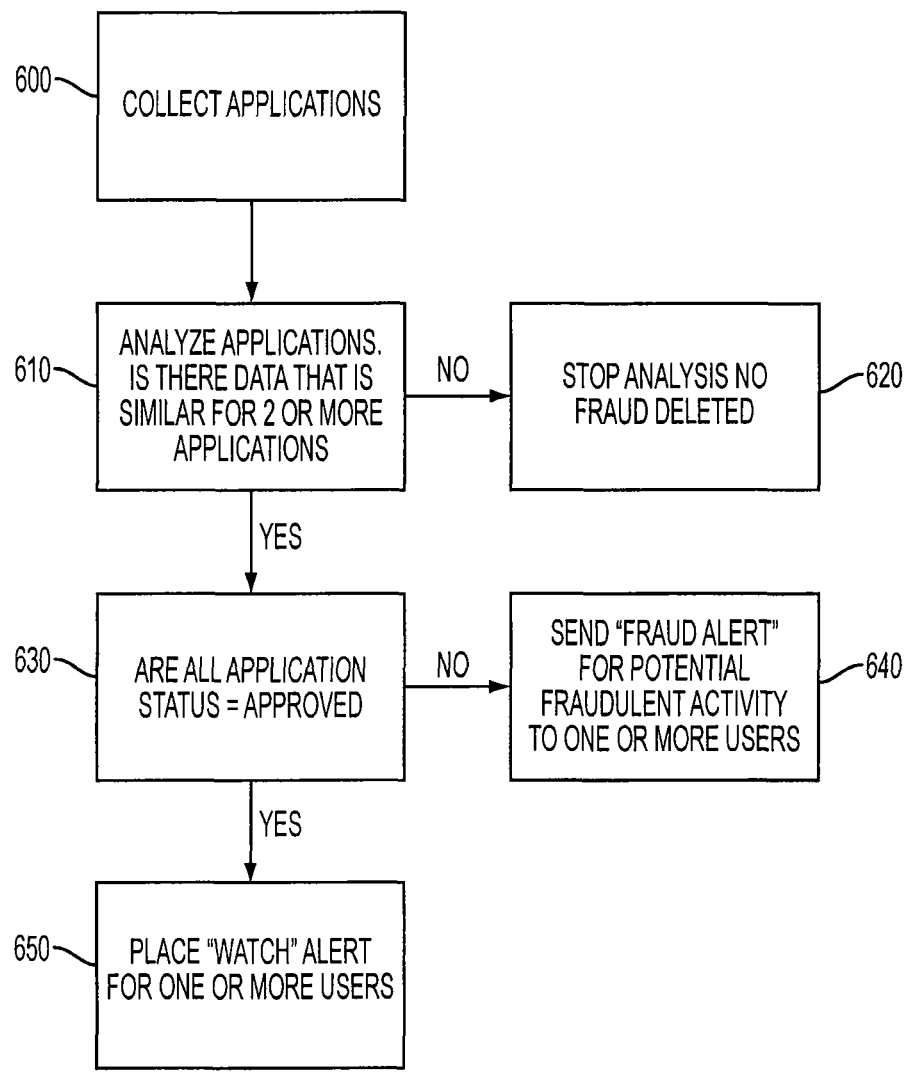
FIG. 6 shows one the flow charts of an exemplary embodiment of the present invention.

FIG. 6 shows one the flow charts of an exemplary embodiment of the present invention. As shown in step 600, the system collects applications from the various users, e.g., lenders. At step 610, the system analyzes the applications to detect whether 2 or more of the applications have similar data, e.g., same property address. If the system does not find 2 or more data that are similar on any of the applications, the system stops its analysis at step 620. If the system does find two or more applications which have similar data, then in the next step 630, the system checks to see if all of the application statuses are "approved." If the system determines that all of the applications which have similar data have an approved status, then step 630, the system sends a "watch" alert to one or more of the users indicating that there are other pending approved applications. If the system determines that of the application which have similar data do not have an approved status, then at step 640, the system sends a "Fraud Alert" to each user communicating that there is potential fraudulent activity going on.

It is also to be understood that the following claims are intended to cover all of the generic and specific features of the invention herein described, and all statement of the scope of the present invention which, as a matter of language, might be said to fall therebetween.

What is claimed is:

1. A computer-based method of detecting potentially fraudulent loan applications on a property, comprising:
   obtaining data from a plurality of loan applications and storing the data in a database;
   searching the data in the database and detecting, using a server, whether at least two of the plurality of loan applications are using the same property as collateral;
   determining, using the server, a status for each of the plurality of loan applications which are using the same property as collateral;
   identifying, using the server, two or more of the plurality of loan applications which are using the same property as collateral, where each of the two or more of the plurality of loan applications identified is currently pending, has an approved status, and is from a different lender; and
   alerting, using the server, a user of the two or more of the plurality of loan applications identified as potentially fraudulent loan applications on a property.

2. The method according to claim 1, wherein the alerting, using the server, a user comprises providing an electronic message to the user.

3. The method according to claim 1, further comprising providing, using the server, the user with a real-time loan status for each loan application.

4. The method according to claim 1, further comprising producing, using the server, a custom report that analyzes lender's own efficiency in processing loan applications as compared with an industry benchmark.

5. An apparatus for detecting potentially fraudulent loan applications on a property, comprising:
   a server configured to collect loan application data from a plurality of loan applications and store the data in a database, wherein the server detects and alerts a user that at least two of the plurality of loan applications are for the same property and have been approved for funding as potentially fraudulent loan applications on a property, wherein each of the at least two of the plurality of loan applications is currently pending, and is from a different lender.

6. The apparatus of claim 5, wherein the loan application data is selected from a group consisting of a borrower name, an address of a target property that a borrower seeks to finance, a loan amount, a loan purpose, whether the target property is owner occupied, a target property value, a loan status with any status change date and time stamped, and loan-to-value estimates.

7. The apparatus of claim 6, wherein the loan purpose is selected from a group consisting of purchase, refinance, cash out, and home equity line of credit.

8. A non-transitory computer readable storage medium comprising instructions which, when executed by a computer system and is connected to at least one data repository, perform a method comprising:
   (a) obtaining, by the computer system, data from a plurality of loan applications and storing the data in the data repository;
   (b) searching, by the computer system through a communication channel, the data in the data repository and detecting whether at least two of the plurality of loan applications are using the same property as collateral;
   (c) identifying, by the computer system, two or more of the plurality of loan applications which are using the same property as collateral, where each of the two or more of the plurality of loan applications identified is currently pending, has an approved status, and is from a different lender; and
   (d) alerting, by the computer system, a user of the two or more of the plurality of loan applications identified.

9. The non-transitory computer readable storage medium according to claim 8, wherein the alerting a user comprises providing an electronic message to the user.

10. The non-transitory computer readable storage medium according to claim 8, wherein the method further comprises providing, by the computer system, the user with a real-time loan status for each loan application.

11. The non-transitory computer readable storage medium according to claim 8, wherein the method further comprises producing, by the computer system, a custom report that analyzes lender's own efficiency in processing loan applications as compared with an industry benchmark.

* * * * *